(12) United States Patent
Pasquale et al.

(10) Patent No.: US 8,218,754 B2
(45) Date of Patent: Jul. 10, 2012

(54) SYSTEM, METHOD AND SOFTWARE FOR TRANSITIONING BETWEEN SPEECH-ENABLED APPLICATIONS USING ACTION-OBJECT MATRICES

(75) Inventors: Theodore B. Pasquale, Austin, TX (US); Benjamin A. Knott, Round Rock, TX (US); Kurt M. Joseph, Austin, TX (US); Robert R. Bushey, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 214 days.

(21) Appl. No.: 12/619,289

(22) Filed: Nov. 16, 2009

(65) Prior Publication Data
US 2010/0061544 A1    Mar. 11, 2010

Related U.S. Application Data

(63) Continuation of application No. 10/843,924, filed on May 12, 2004, now Pat. No. 7,620,159.

(51) Int. Cl.
*H04M 1/64* (2006.01)
*H04M 3/00* (2006.01)
(52) U.S. Cl. .............................. 379/265.05; 379/88.04
(58) Field of Classification Search ............... 379/88.04, 379/265
See application file for complete search history.

(56) References Cited

U.S. PATENT DOCUMENTS

| | | | | |
|---|---|---|---|---|
| 5,937,051 A * | 8/1999 | Hurd et al. | ............... | 379/212.01 |
| 6,246,759 B1 * | 6/2001 | Greene et al. | ............. | 379/265.02 |
| 6,778,659 B2 * | 8/2004 | Andersen | ................. | 379/265.02 |
| 6,920,213 B2 * | 7/2005 | Pershan | ................... | 379/212.01 |
| 6,961,419 B2 * | 11/2005 | Power et al. | ............. | 379/265.09 |
| 7,003,087 B2 * | 2/2006 | Spencer et al. | .......... | 379/211.01 |
| 7,505,572 B2 * | 3/2009 | McCullough et al. | ..... | 379/93.17 |
| 7,526,079 B2 * | 4/2009 | Mello | ........................ | 379/212.01 |
| 7,567,653 B1 * | 7/2009 | Michaelis | ....................... | 379/52 |
| 7,567,662 B1 * | 7/2009 | Renner et al. | ............. | 379/202.01 |
| 7,580,837 B2 * | 8/2009 | Bushey et al. | ................ | 704/244 |
| 7,602,895 B2 * | 10/2009 | Terry et al. | ............... | 379/215.01 |
| 7,620,159 B2 * | 11/2009 | Pasquale et al. | ........... | 379/88.04 |
| 7,684,550 B2 * | 3/2010 | McCullough et al. | ..... | 379/93.17 |
| 7,724,889 B2 * | 5/2010 | Bushey et al. | ........... | 379/265.02 |
| 7,751,551 B2 * | 7/2010 | Bushey et al. | ........... | 379/265.02 |
| 7,770,175 B2 * | 8/2010 | Flockhart et al. | ............. | 718/105 |
| 7,792,276 B2 * | 9/2010 | Moore et al. | ............. | 379/265.12 |
| 7,817,796 B1 * | 10/2010 | Clippinger et al. | ....... | 379/266.01 |
| 7,864,944 B2 * | 1/2011 | Khouri et al. | ............. | 379/265.02 |
| 7,894,596 B2 * | 2/2011 | Moore et al. | ............. | 379/265.12 |
| 7,940,913 B2 * | 5/2011 | Patel et al. | ............... | 379/265.02 |
| 8,023,626 B2 * | 9/2011 | Moore et al. | ............... | 379/90.01 |

\* cited by examiner

*Primary Examiner* — Joseph T Phan
(74) *Attorney, Agent, or Firm* — Jackson Walker L.L.P.

(57) ABSTRACT

A system, method and software are described for facilitating transitions between speech-enabled applications employing action-object matrices. In an exemplary embodiment, an automatic call router determines a service agent destination by identifying an action-object combination included in a user utterance. In addition to forwarding the user to the service agent destination, the automatic call router sends one or more aspects of the user utterance to the service agent for use therewith. The service agent may then use aspects of the forwarded information to request further information from the user or to begin performance of a user desired transaction.

9 Claims, 7 Drawing Sheets

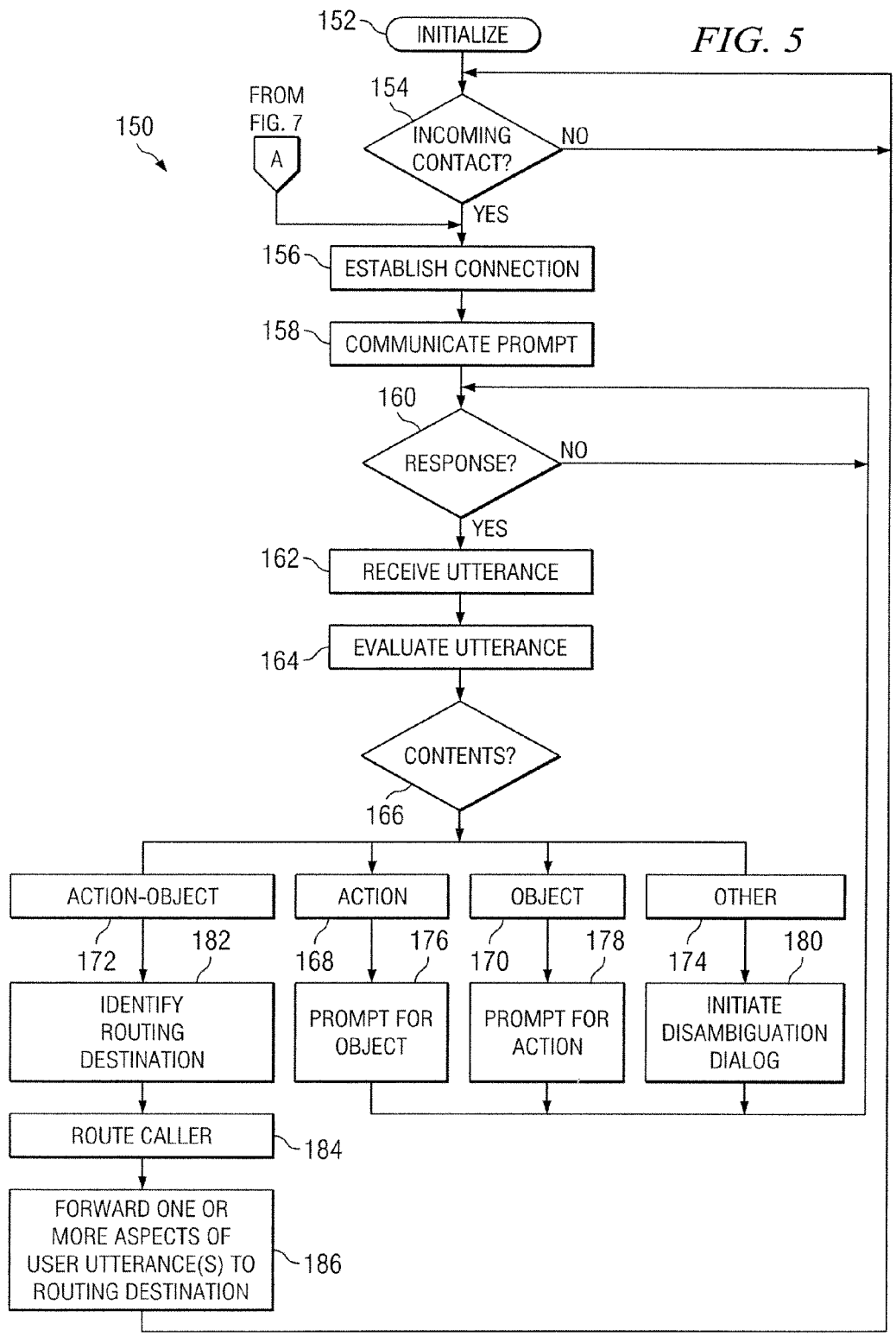

FIG. 6

| OBJECTS | ACQUIRE | CANCEL | CHANGE | INQUIRE | INFORM | HOW TO USE | SCHEDULE | FIX REPAIR | WHERE | RECONNECT | MOVE | PAY |
|---|---|---|---|---|---|---|---|---|---|---|---|---|
| OPTIONAL SERVICES: CALLNOTES CALLFORWARDING CALLERID PACKAGES DSL LONGDISTANCE ETC. | • 214 | • | • | • | | | | | | | | |
| BASIC SERVICE | • | • | • | • | | • 212 | | • | | | | |
| CPE | • | • | • | • | | • | | • | | | | |
| ACCOUNT | | | • 206 | • | • | | | • | | | | |
| BILL | | | | • | • | | | • 208 | | | | • |
| ACQUISITION | | • | • | • | • | | • | | | | | |
| CANCELATION | | • | • | • | • | | • | | | | | |
| FIX-REPAIR | | • | • | • | • | | • | | | | | |
| MOVE | | • | • | • | • | | • | | | • | • | |
| PAYMENT | | | • | • | | • | | | • 210 | | | |
| OTHER PROVIDERS | | | | • | | | | | | | | |
| COUPONS SPECIALS | | | | • | | | | | | | | |
| NAME/ NUMBER | | | | • | | | | | | | | |
| STORE LOCATIONS | | | | | | | | | | | | |

204 OBJECTS — 202 ACTIONS — 200

FIG. 8

| OBJECTS (SERVICES) | ACTIONS (TOPICS) | | | | | | |
|---|---|---|---|---|---|---|---|
| | SET UP | TURN ON | TURN OFF | GET PRICE | RETRIEVE MESSAGES | CHANGE PASSWORD | ⋯ |
| CALLNOTES | • | • | • | • | • | • | ⋯ |
| CALLER ID | • | • | • | • | | | ⋯ |
| CALL FORWARDING | • | • | • | • | | | ⋯ |
| DISTINCTIVE RING | • | • | • | • | | | ⋯ |
| DSL | • | • | • | • | | | ⋯ |
| CALL BLOCKER | • | • | • | • | | | ⋯ |
| CALL TRACE | • | • | • | • | | | ⋯ |
| PRIVACY MANAGER | • | • | • | • | | • | ⋯ |
| ⋯ | ⋯ | ⋯ | ⋯ | ⋯ | ⋯ | ⋯ | |

US 8,218,754 B2

SYSTEM, METHOD AND SOFTWARE FOR TRANSITIONING BETWEEN SPEECH-ENABLED APPLICATIONS USING ACTION-OBJECT MATRICES

TECHNICAL FIELD OF THE INVENTION

The present invention relates generally to call center technology and, more particularly, to transitioning between speech-enabled call center applications.

BACKGROUND OF THE INVENTION

Developments in speech recognition technologies support more natural language interaction between services, systems and customers than that previously supported. One of the most promising applications, Automatic Call Routing (ACR), seeks to determine why a customer has called a service center and to route the customer to an appropriate service agent for customer request servicing. Speech recognition technology generally allows an ACR application to recognize natural language statements, minimizing reliance on conventional menu systems. This permits a customer to state the purpose of their call "in their own words". In light of its effectiveness, speech recognition capabilities are now being implemented into service agents where callers are routed by the ACR.

In order for an ACR application to properly route calls, the ACR generally must interpret the intent of the customer, identify the type or category of customer call, and identify the correct routing destination for the call type. In some instances, the information obtained by the ACR application has applicability beyond mere call routing. In such instances, call center efficiency may be increased by enabling the use of such information in other call center areas.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 5 is a flow diagram depicting an exemplary embodiment of an action-object based speech recognition enabled automatic call routing method incorporating teachings of the present invention;

FIG. 6 is a diagram depicting an exemplary embodiment of an automatic call router action-object matrix incorporating teachings of the present invention;

FIG. 8 is a diagram depicting an exemplary embodiment of a transaction servicing agent action-object matrix incorporating teachings of the present invention.

DETAILED DESCRIPTION OF THE INVENTION

Preferred embodiments and their advantages are best understood by reference to FIGS. 1 through 8, wherein like numbers are used to indicate like and corresponding parts.

In one aspect, the present invention proposes the use of action-object matrices for self service applications in addition to an ACR application and, provides a method for the interaction of action-object matrices for two or more speech-enabled services. This approach may be advantageous in that it supports substantially seamless integration of multiple speech-enabled applications. It also provides a coherent and logical user experience.

According to teachings of the present invention, when a call is routed from an ACR to a self service application, it may be desirable to use information gathered by the ACR to direct an ensuing dialog within a self service application to which the caller is routed. If performed properly, the customer should not notice having been routed. Instead, the dialog will continue from the ACR to another self service application in a logical and coherent manner. For example, if the caller utterance in the ACR is "I need help using CallNotes," the ACR may route the customer a the How-to-Use (HTU) self service application which can provide operating instructions for phone or other services.

Without teachings of the present invention, it would be unusual to route a customer to the beginning of a HTU service agent dialog in which the caller would be asked to repeat the name of the service about which they have a question. This approach would appear awkward and annoying to the customer who had just stated his/her interest in CallNotes. If Action-Object Matrices (AOM) are employed in both the ACR and the HTU, information may be passed from the ACR to the HTU such that dialog presented by the HTU may be directed in accordance therewith. For example, if the caller utterance in the ACR is "I need help using CallNotes", the ACR may tag that statement with the "How-to-use—CallNotes" action-object combination or pair. The object from this pair may then be passed to the HTU AOM in the HTU service agent, filling in the object information for the HTU action-object pair. The HTU system may then present dialog for acquiring the missing information, e.g., a HTU action. In this manner, the present invention provides a seamless transition between two speech-enabled applications.

In accordance with an exemplary embodiment of teachings of the present invention, an ACR tags a customer utterance with an action-object pair. The object is then passed to a self-service application AOM. Since the object information is provided to the self-service application, the self-service application dialog may proceed with prompting to identify a self-service application action. If both a valid object and a valid action are passed from the ACR, the self-service application may not need to prompt the customer for information and may begin provision of desired information or instructions.

Figure 1:
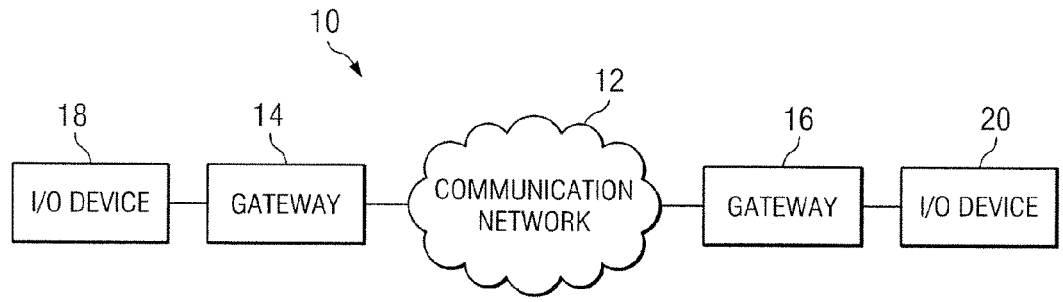
FIG. 1 is a schematic diagram depicting an exemplary embodiment of a telecommunications system incorporating teachings of the present invention.

Referring first to FIG. 1, a schematic diagram of an exemplary embodiment of a telecommunications system, indicated generally at 10, is shown according to teachings of the present invention. Telecommunication system 10 may include communication network 12 in communication with one or more gateway devices 14 and 16. Input/output (I/O) devices 18 and 20 are each preferably in communication with respective gateway devices 14 and 16. Accordingly, I/O devices 18 and 20 may be in selective communication with one another via gateway devices 14 and 16, and communication network 12.

In one embodiment, communication network 12 may be a public switched telephone network (PSTN). In alternate embodiments, communication network 12 may include a cable telephony network, an IP (Internet Protocol) telephony network, a wireless network, a hybrid Cable/PSTN network, a hybrid IP/PSTN network, a hybrid wireless/PSTN network or any other suitable communication network or combination of communication networks.

Gateways 14 and 16 preferably provide I/O devices 18 and 20 with an entrance to communication network 12 and may include software and hardware components to manage traffic entering and exiting communication network 12 and conversion between the communication protocols used by I/O devices 18 and 20 and communication network 12. In some embodiments, gateways 14 and 16 may function as a proxy server and/or a firewall server for I/O devices 18 and 20. In some embodiments, gateways 14 and 16 may be associated with a router (not expressly shown) operable to direct a given packet of data that arrives at gateway 14 or 16, and a switch (not expressly shown) operable to provide a communication path in to and out of gateway 14 or 16.

In the present embodiment, I/O devices 18 and 20 may include a variety of forms of equipment connected to communication network 12 and accessible to a user. I/O devices 18 and 20 may be telephones (wireline or wireless), dial-up modems, cable modems, DSL (digital subscriber line) modems, phone sets, fax equipment, answering machines, set-top boxes, televisions, POS (point-of-sale) equipment, PBX (private branch exchange) systems, personal computers, laptop computers, personal digital assistants (PDAs), SDRs, other nascent technologies, or any other appropriate type or combination of communication equipment available to a user. I/O devices 18 and 20 may be equipped for connectivity to communication network 12 via a PSTN, DSL, cable network, wireless network, or any other appropriate communications channel.

Figure 2:
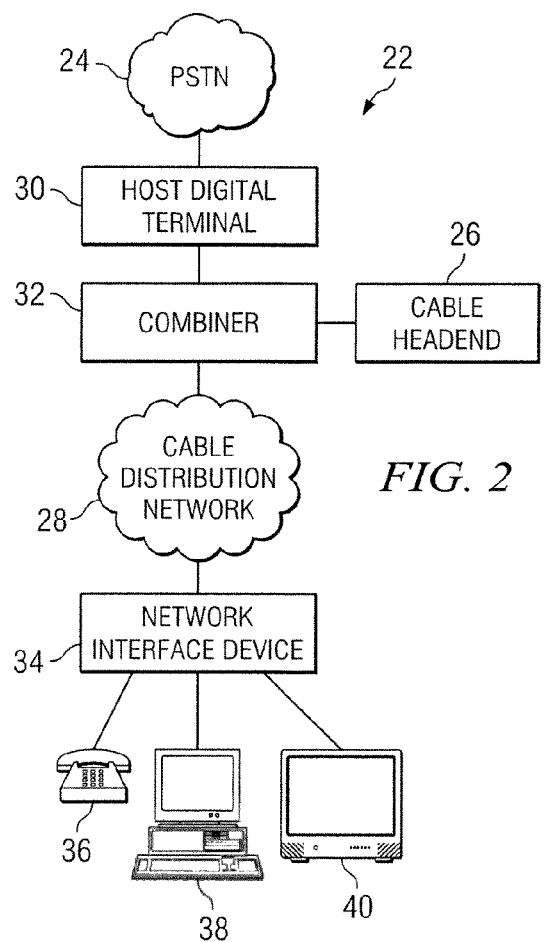
FIG. 2 is a schematic diagram depicting an alternate exemplary embodiment of a telecommunications system incorporating teachings of the present invention.

Referring now to FIG. 2, a block diagram of an exemplary embodiment of a telecommunication system 22 incorporating teachings of the present invention is shown. In the exemplary embodiment shown, system 22 preferably includes a PSTN 24 and cable head-end 26 in communication with cable distribution network 28. PSTN 24 may be in operable communication with host digital terminal (HDT) 30 and function to convert signals received from PSTN 24 for transmission over cable networks. Host digital terminal 30 and cable head-end 26 may be in communication with combiner 32. Combiner 32 may communicate data received from cable head-end 26 and/or PSTN 24 to cable distribution network 28. Cable distribution network 28 may further communicate data to network interface device 34 and on to a user via telephone 36, computer 38, television 40 or any other suitable I/O device. Cable head-end 26 may provide cable television programming and cable modem communications. Cable head-end 26 typically includes a cable modem termination system (not expressly shown) for sending and receiving digital cable modem signals.

Figure 3:
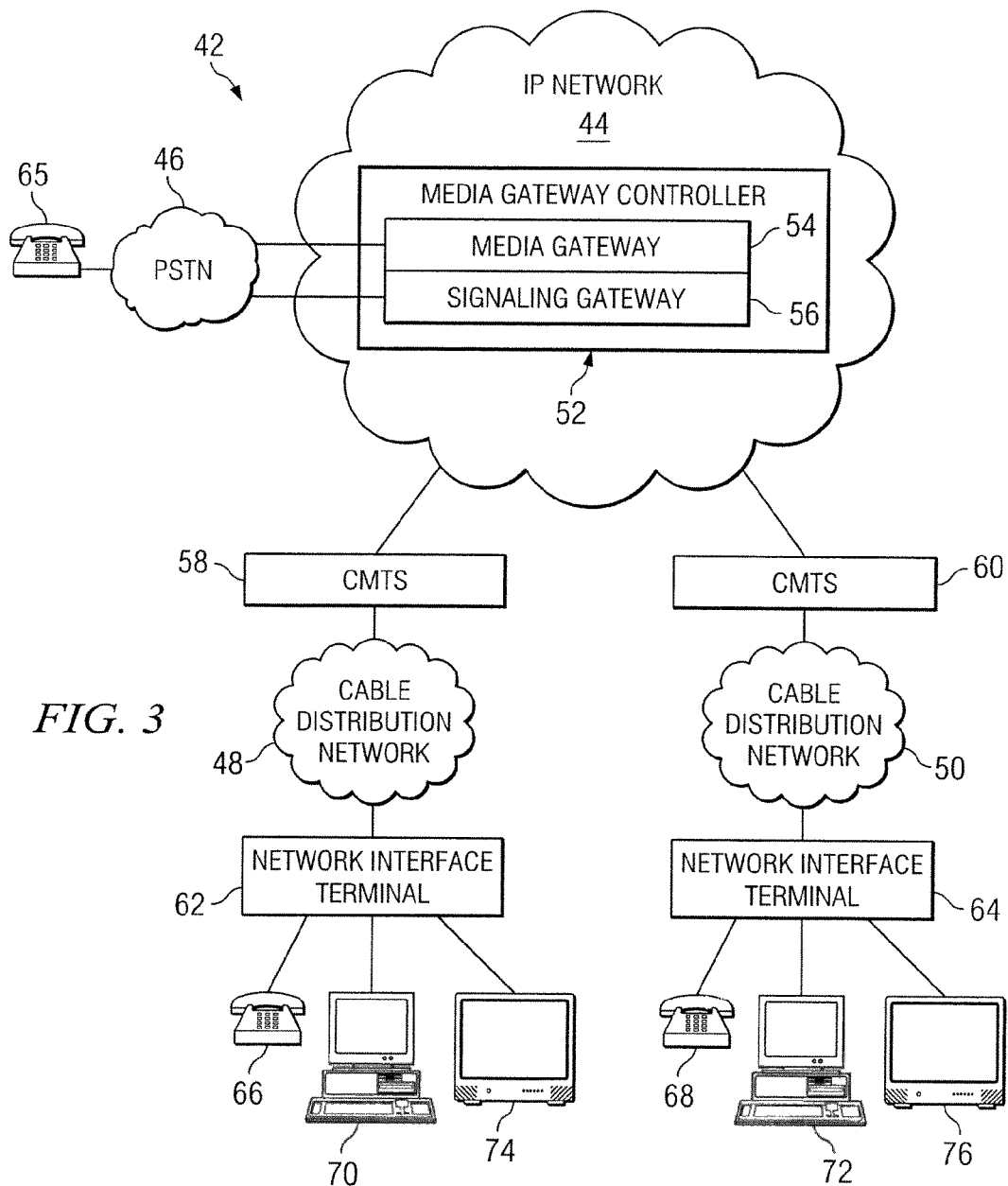
FIG. 3 is a schematic diagram depicting a further exemplary embodiment of a telecommunications system incorporating teachings of the present invention.

Referring next to FIG. 3, a block diagram of an exemplary embodiment of a telecommunication system 42 incorporating teachings of the present invention is shown. This exemplary embodiment generally includes interconnected IP network 44, PSTN 46, and cable distribution networks 48 and 50. IP network 44 may include media gateway controller 52, media gateway 54, and signaling gateway 56. Media gateway 54 and signaling gateway 56 may be in operative communication with PSTN 46 and facilitate communication of information therebetween.

IP network 44 may further communicate with cable distribution networks 48 and 50 via cable modem termination systems (CMTS) 58 and 60, respectively. CMTS 58 and 60 may convert IP packets received from IP Network 44 for transmission on cable distribution networks 48 and 50 and convert signals received from cable distribution networks 48 and 50 into IP Packets for transmission to IP Network 44. Cable distribution networks 48 and 50 may communicate information with users via network interface terminals 62 and 64. Network interface terminals 62 and 64 may provide data services to users through I/O devices such as, telephones 66 and 68, computers 70 and 72, and televisions 74 and 76. One or more data services may also be provided to a user through PSTN 46 and one or more I/O devices such as telephone 65.

Telecommunication system 42 of FIG. 3 preferably allows transmission of services to be delivered to users where such services include, without limitation, voice over Internet protocol ("VoIP"), video over Internet, video-on-demand over broadband connections, and the ability to view television and film images as well as broadcasts. In addition, one of ordinary skill will appreciate that other embodiments can be deployed with many variations in the number and type of I/O devices, communication networks, the communication protocols, system topologies, and myriad other details without departing from the spirit and scope of the present invention.

Figure 4:
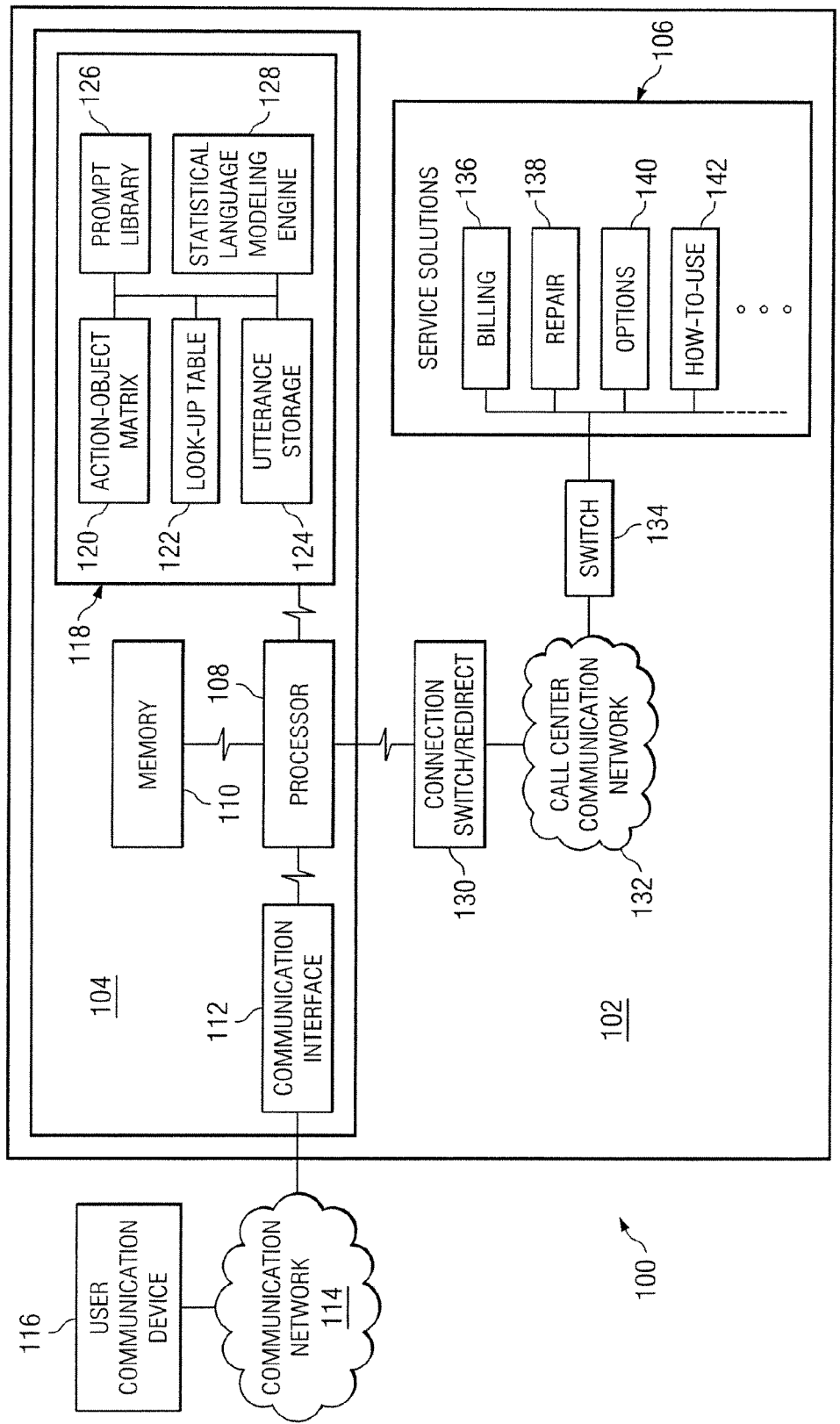
FIG. 4 is a block diagram depicting an exemplary embodiment of a service center system incorporating teachings of the present invention.

Referring now to FIG. 4, a block diagram illustrating an exemplary embodiment of a service center incorporating teachings of the present invention is shown. While reference herein is made primarily to a telephone services customer service call center, alternate implementations of teachings of the present invention may be employed without departing from the spirit and scope thereof.

Illustrated generally at 100 is an exemplary embodiment of a system operable to permit user performance of one or more transactions via a plurality of available service center service agents. As illustrated in FIG. 4, system 100 includes service center 102. Service center 102 may include one or more computing apparatuses 104 operably coupled to one or more transaction processing service solutions 106.

Included in computing apparatus 104 is processor 108. Operably coupled to processor 108 of computing apparatus 104 is memory 110. Computing apparatus 104 preferably employs processor 108 and memory 110 to execute and store, respectively, one or more instructions of a program of instructions.

Also included in computing apparatus 104 illustrated in FIG. 4 is communication interface 112. Communication interface 112 is preferably operable to couple computing apparatus 104 and/or service center 102 to an internal and/or external communication network 114. According to teachings of the present disclosure, communication network 114 may be implemented as a PSTN, a cable telephony network, an IP telephony network, a wireless network, a hybrid cable/PSTN network, a hybrid IP/PSTN network, a hybrid wireless/PSTN network, or any other suitable communication network or combination of communication networks.

Communication interface 112 preferably cooperates with communication network 114 and user communication device 116 to permit user performance of one or more transactions via service center 102. As described above, user communication device 116 may be a wireless or wireline telephone, dial-up modem, cable modem, DSL modem, or any other appropriate type or combination of communication equipment available to a user.

In operation, service center 102 preferably permits a user to request, in their own, natural language, processing or performance of one or more transactions available from transaction processing service solutions 106. To enable such processing, computing apparatus 104 may include or have access to one or more storage devices 118 including one or more programs of instructions substantially operable to interpret user intent, identify a solution sought by the user and route the user to an appropriate service solution agent.

To aid in the interpretation, identification and routing operations of service center 102, storage 118 preferably includes action-object matrix 120, look-up table 122, utterance storage 124, prompt library 126, as well as one or more speech recognition capabilities, such as statistical language modeling engine 128. Additional detail regarding the operation and cooperation of the various components preferably included in storage 118 will be discussed in greater detail below.

In one embodiment of the present invention, computing apparatus 104 is preferably communicatively coupled to one or more connection switches or redirect devices 130. Connection switch or redirect device 130 preferably enables computing apparatus 104, upon determining an appropriate service agent destination for the processing of a user selected transaction, to route the user or caller via communication network 132 and, optionally, one or more switches 134, to an appropriate service agent or module of transaction processing service solution 106.

Transaction processing service solution 106 preferably includes a plurality of service agents or modules operable to perform one or more operations in association with the processing of a selected user transaction. For example, transaction processing service solution 106 may include one or more service agents or modules operable to perform billing service solutions 136, repair service solutions 138, option service solutions 140, how-to-use service solutions 142, as well as other service solutions. In addition, the service agents or modules implemented in or in association with transaction processing service solutions 106 may include, but are not limited to, automated or self-service data processing apparatuses, live technician support (human support), as well as combinations thereof.

Referring now to FIG. 5, one embodiment of a method for a speech-enabled call routing call application using an action-object matrix is shown according to teachings of the present invention. Method 150 of FIG. 5 may be implemented in one or more computing apparatuses 104 of one or more service centers 102, such as a telecommunications call service center.

Upon initialization at 152, method 150 preferably proceeds to 154. At 154, method 150 preferably provides for and awaits an incoming communication contact from a user. In one embodiment, method 150, at 154, may await user contact via user communication device 116 across communication network 114 with communication interface 112 of computing apparatus 104. Myriad embodiments of user contact with a service or call center are contemplated within the spirit and scope of teachings of the present disclosure.

Upon detection of an incoming contact at 154, method 150 preferably proceeds to 156 where a communication connection with the incoming contact is preferably established. As suggested above, establishing a communication connection with an incoming contact at 156 may include, but is not limited to, receiving a user phone call via a PSTN or other wireline network, a wireless network, as well as numerous other communication connection implementations.

Once a communication connection has been established at 156, method 150 preferably proceeds to 158. At 158, one or more prompts may be communicated to the user. In one aspect, the communication of one or more prompts at 158 is aimed at eliciting a request for the processing of one or more transactions or operations from the user. For example, computing apparatus 104, at 158, may access prompt library 126 of storage 118 to generate a user transaction selection prompt such as, "Thank you for calling our service center. Please tell me how we may help you today." Alternate embodiments of generating one or more prompts designed to elicit user entry or selection of a transaction are contemplated within the spirit and scope of teachings of the present invention.

At 160 of method 150 user response to the communicated prompt is preferably awaited. Upon detection of a user response at 160, method 150 preferably proceeds to 162 where a natural language utterance responsive to the communicated prompt is preferably received. Receipt of a natural language utterance from a user at 162 may include storage of the user's natural language utterance in utterance storage 124 of computing apparatus storage 118. Permanent or temporary storage of a natural language user utterance may enable and/or simplify the performance of speech recognition analysis thereon.

Following receipt of a natural language user utterance at 162, method 150 preferably proceeds to 164. At 164 the user's natural language utterance is preferably evaluated in pursuit of interpreting or identifying an intent of the user and a requested operation or processing. In one embodiment of the present invention, evaluation of a natural language user utterance at 164 may include the use of one or more speech recognition technologies, such as that available from statistical language modeling engine 128 of computing apparatus 104. By evaluating the natural language user utterance using speech recognition technology at 164, recognition of a natural language transaction selection may be achieved. As suggested above, statistical language modeling engine 128 may cooperate with utterance storage 124 in its performance of natural language user utterance evaluation.

According to teachings of the present invention, statistical language modeling engine 128 preferably evaluates the natural language user utterance received at 162 in cooperation with action-object matrix 120. In the evaluation of a natural language user utterance at 164, the speech recognition technology preferably employed by computing apparatus 104 seeks to identify an action, an object or an action-object combination from the natural language user utterance. In one aspect, the provision of action-object matrix 120 generally simplifies development and reduces the costs of automated call routing application development. By creating a finite number of transaction options via action-object matrix 120, proper routing of a user to a service agent or module 136, 138, 140 or 142, may be accomplished with great efficiency, e.g., substantially eliminating user routing errors and, therefore, user re-routing.

As at least a portion of the natural language user utterance evaluation performed at 164 preferably includes seeking whether the natural language user utterance includes an action, object or action-object combination, method 150, at 166, preferably determines whether a natural language user utterance includes either an "action" 168, "object" 170, "action-object" combination 172 or other information 174.

If at 166 it is determined that the natural language user utterance contains only an "action 168", method 150 preferably proceeds to 176 where one or more additional prompts may be communicated to the user. The prompts presented at 176 are preferably designed to elicit an object selection in a subsequent natural language user utterance.

For example, referring to the action-object matrix depicted in FIG. 6, it may have been determined from the natural language user utterance that the user desires to inquire as to certain aspects available from service center 102. Having identified that the user wishes to make an "inquiry", computing apparatus 104 may cooperate with prompt library 126 and action-object matrix 120 to prompt the user for selection of an "object" associated with the "inquire" action. As illustrated in FIG. 6, examples of objects associated with the "inquire" action include, in one embodiment, optional services, basic service, billing, cancellation, repair, payment, specials as well as name and number.

Similarly, if at 166 it is determined that the natural language user utterance contains only an "object" 170, method 150 preferably proceeds to 178 where one or more prompts for a natural language utterance from the user preferably containing an "action" selection may be generated. Referring again to the action-object matrix generally depicted in FIG. 6, if it is determined from the natural language user utterance that the user desires transaction processing in association with a service bill, computing apparatus 104 may cooperate with action-object matrix 120 and prompt library 126 to generate one or more prompts directed to eliciting user selection, in their own words, of an "action" associated with the bill "object". As shown in FIG. 6, examples of actions associated with a bill object may include, in one embodiment, inquiry, information, fixing or repairing and paying.

It should be understood that the action-object matrix depicted generally in FIG. 6 is included primarily for purposes of illustration. As such, alternate embodiments of an action-object matrix may be implemented without departing from the spirit and scope of teachings of the present invention.

If at 166 evaluation of the natural language user utterance does not lead to identification of an "action" 168, "object" 170 or an "action-object" combination 172, method 150 preferably proceeds to 180 where a disambiguation dialogue may be initiated and performed. In one example, it may be determined at 166 that the contents of the natural language user utterance contains more than one "action," "object," no indication of an "action" or an "object", or other information failing to indicate user selection of a desired transaction. In such an event, method 150 preferably provides for additional dialogue to be performed with the user in an effort to elicit a usable "action-object" combination from the user.

Following prompting for an "object" at 176, for an "action" at 178 or initiation and performance of disambiguation dialogue at 180, method 150 preferably returns to 160 where a response may be awaited as described above. Method 150 then preferably proceeds through the operations at 162, 164 and 166, in one embodiment, until an "action-object" combination 172 has been elicited from the user in a natural language utterance. An escape sequence may also be included in method 150 where it has been determined that the present user requires live assistance, for example.

Following identification from the user's natural language utterance of an "action-object" combination 172, method 150 preferably proceeds to 182. At 182, computing apparatus 104 preferably cooperates with action-object matrix 120 and look-up table 122 to identify a preferred or proper routing destination for processing the user selected transaction. As suggested above, the routing destinations identified at 182 may include routing destinations associated with the service agents or modules available in transaction processing service solutions 106. As mentioned above, service agents or modules 136, 138, 140 and 142 may include automated transaction processing available via computing apparatus 104 or a similar device, live support, combinations thereof, as well as other transaction processing options.

Following identification of a preferred or proper routing destination at 182, method 150 preferably proceeds to 184. At 184 the user or caller connection is preferably routed to the appropriate, proper or preferred routing destination indicated in look-up table 122.

Following the routing of the caller and/or the user connection at 184, method 150 preferably proceeds to 186. At 186 one or more aspects of the user utterance or utterances are preferably forwarded to the service agent or module destination to which the caller and/or user connection is routed. In an exemplary embodiment, method 150 provides for the action-object combination identified by the ACR application to be forwarded to the service agent associated with the selected routing destination. In an alternate embodiment, one or more recorded user utterances from the current caller connection may be forwarded to the routing destination for consideration. Following the forwarding of at least one aspect of the user utterances of the current call event at 186, method 150 preferably returns to 154 where another user connection may be awaited.

Referring again to FIG. 6, an action-object matrix incorporating teachings of the present invention is shown. As shown in FIG. 6, action-object matrix 200 preferably includes a plurality of columns or rows, depending on implementation, of actions 202. Action-object matrix 200 preferably also includes a plurality of rows or columns, depending upon implementation, of objects 204. The intersection of an action row or column with an object column or row, respectively, generally defines an action-object pair or combination identifying a transaction or task available from service center 102 via, for example, one or more service modules or agents 136, 138, 140 and 142.

In accordance with teachings of the present invention, service center 102, method 150 and action-object matrix 200 preferably cooperate to interpret user intent and identify a desired transaction and correct routing destination from natural language user utterances. For example, using actions 202 and objects 204 of action-object matrix 200, in conjunction with method 150, a natural language user utterance such as "How much do I owe on my bill?" may be evaluated to contain the action-object combination inquire/bill 206. In a further example, the natural language user utterance, "I have a problem with a charge on my bill" may produce the action-object combination fix-repair/bill 208. In still another example, the natural language user utterance, "Where can I go to pay my phone bill?" may be evaluated to include the action-object combination of where/payment 210. In yet another example, the natural language user utterance, "How do I set up Call Forwarding?" may be evaluated to include the action-object combination how-to-use/option services 212. In yet another example, the natural language user utterance, "I'd like to get CallNotes." may be evaluated to include the action-object combination acquire/optional services 214.

As mentioned above, action-object matrix 200 preferably cooperates with a look-up table to identify the routing destination associated with an identified action-object combination. For example, upon identifying action-object combination inquire/bill 206 from a natural language user utterance, computing apparatus 104 may utilize action-object matrix storage 120 and look-up table 122 to determine that the appropriate routing destination for inquire/bill action-object combination 206 is "Bill" service agent or module 136.

In another example, upon identifying action-object combination fix-repair/bill from a natural language user utterance, computing apparatus 104 cooperating with action-ob ject matrix storage 120 and look-up table 122 may determine that an appropriate routing destination for the user connection includes "Repair" service agent or module 138. Additional implementations of associating a look-up table with an action-object matrix may be utilized without departing from the spirit and scope of teachings of the present invention.

Figure 7:
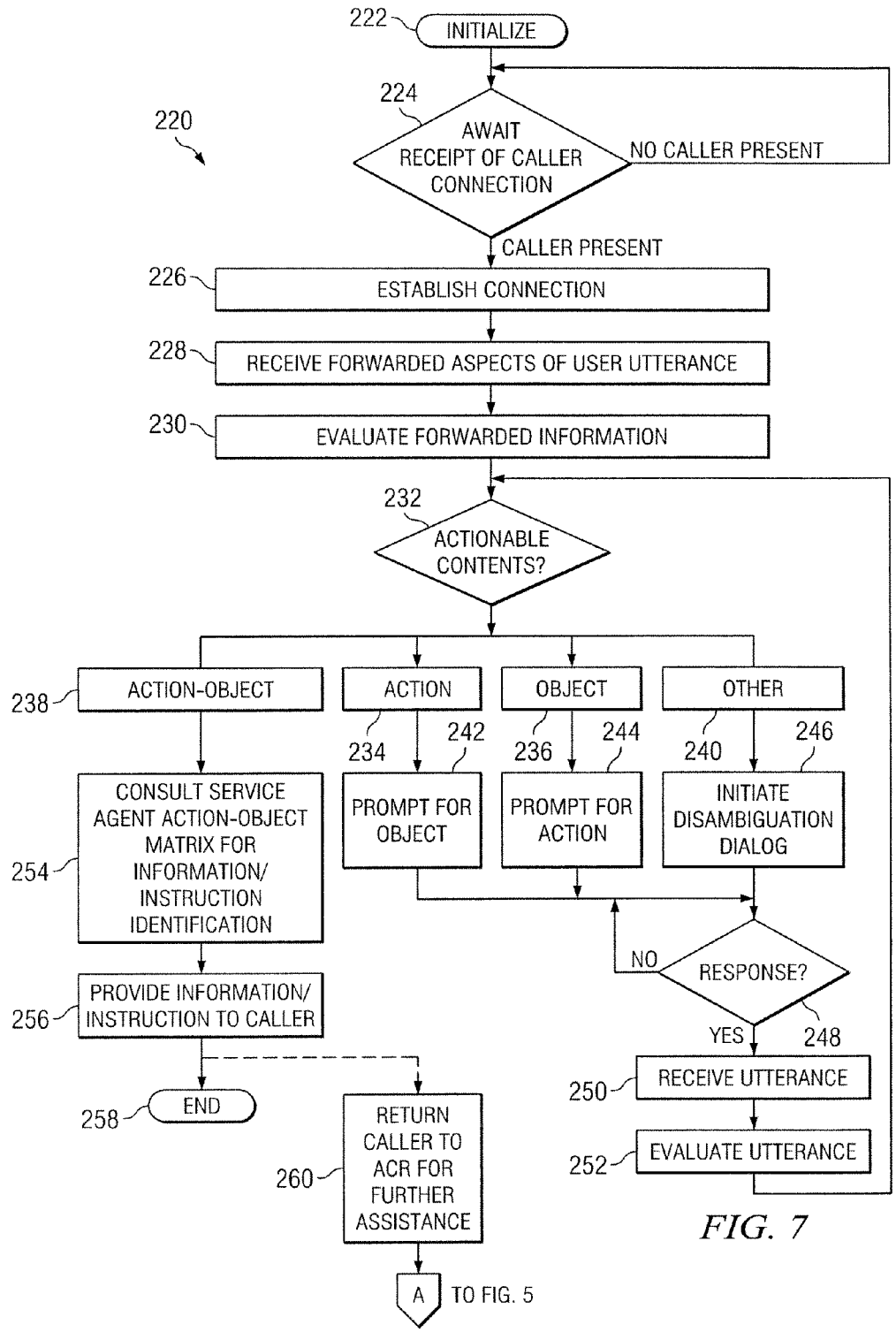
FIG. 7 is a flow diagram depicting an exemplary embodiment of an action-object based speech recognition enabled transaction servicing agent method incorporating teachings of the present invention.

Referring now to FIG. 7, a flow diagram depicting an exemplary embodiment of a method for employing information received from an automatic call router application to increase efficiency and utility in a service agent is shown according to teachings of the present invention. Method 220 may be effected in association with a variety of service agents including, without limitation, self-service and assisted service agents as well as billing, how-to-use, options, repair and other service agents.

Upon initialization at 222, method 220 preferably proceeds to 224 where it remains in a wait state for an incoming connection from an associated ACR or other origination source. Method 220 preferably remains at 224 until an incoming call or contact is detected before proceeding to 226 where a connection with the routed or transferred caller or user is preferably established. In addition to receiving the caller or user at 226, method 220 preferably provides for the destination service agent to receive the one or more forwarded aspects of user utterances concerning the instant call at 230.

Upon receipt of the forwarded one or more aspects of user utterances concerning the instant caller connection at 230, method 220 preferably proceeds to 232. At 232, method 220 preferably provides for the one or more forwarded aspects of user utterances to be evaluated. Similar to the ACR, a service agent employing method 220 preferably also employs an associated action-object matrix and many aspects of the methodology described above with respect to call center 102. Illustrated in FIG. 8 is an exemplary embodiment of an action-object matrix that may be employed with a "How-To-Use" self-service agent.

Similar to the operations described at 166 of method 150 in FIG. 5, method 220, at 232, preferably provides for the interrogation or other evaluation of the forwarded one or more aspects of user utterances pertinent to the instant user or caller. In the analysis or evaluation of the forwarded information, method 220 preferably attempts to ascertain whether the forwarded aspects of user utterances include an "action" 234, "object" 236, "action-object" combination 238 or other contents 240. In one aspect, a goal of the user utterance analysis or interrogation is to identify an action-object combination usable by a service agent action-object matrix and usable by a service agent to assist the caller in performance of their selected or desired transaction.

If at 232 it is determined that the forwarded information contains only an action 234, method 220 preferably proceeds to 242 where the user may be prompted for an object associated with the existing action. Similarly, if at 232 it is determined that the forwarded information contains only an object 234, method 220 preferably proceeds to 244 where the user may be prompted for an action associated with the existing object.

In an exemplary embodiment, seamless integration between an ACR application and one or more service agents may be achieved with the prompting performed at 242 and 244 of method 220. Preferably, at 242 and 244, the user or caller is prompted only for information needed by the prompting service agent to facilitate performance of the user desired transaction, e.g., a missing action, object or action-object pair.

For example, continuing the example presented above, user provision of the utterance "I need help using CallNotes?" in an exemplary embodiment may result in the ACR application identifying the action-object combination how-to-use/CallNotes. The ACR application may then route the caller and forward the how-to-use/CallNotes action-object combination to "How-To-Use" service agent 142.

At 232 of method 220, service agent 142 may analyze the received action-object combination and determine that it includes the object "CallNotes". As a result, processing in service agent module 142 may then proceed to 244 where the caller or user may be prompted as to which CallNotes related action or actions the caller or user seeks to perform. For example, service agent 142 may request user entry of an action using the prompt "On what aspect of CallNotes do you seek assistance?" In this manner, the caller or user is not required to repeat previously submitted information and, from the perspective of the user, the appearance of furthering the user's desired transaction may be achieved.

In an alternate exemplary embodiment, the user utterance "How do I set up CallNotes?" to an ACR application may be sufficient for service agent 142 to proceed to the provision of the user desired information without additional prompting. In the instant example, the ACR application may identify the action-object combination how-to-use/CallNotes. In accordance with method 150, the ACR application may then route the caller, the identified action-object combination and the recorded user utterance to How-To-Use service agent 142.

Upon receipt of the caller connection and forwarded information, service agent 142 may analyze the action-object combination that, for purposes of service agent 142, the only relevant data is the object "CallNotes". As mentioned above, service agent 142 may prompt the user for entry of an action to be performed in association with the object. However, in the present example, service agent 142 may analyze the forwarded recorded user utterance. In doing so, service agent 142 may identify the action "setup" from the user utterance "How do I set up CallNotes?" to create a service agent 142 associated action-object combination setup/CallNotes.

If at 232 it is determined that the forwarded information lacks an action, object or action-object combination, method 220 preferably proceeds to 246 where the user may be prompted for entry of a transaction selection permitting a service agent to assist the caller in the performance of a desired transaction. The operations preferably performed at 242, 244 and 246 may substantially parallel those operations described above with respect to 176, 178 and 180 of method 150 in FIG. 5.

Following prompting for object at 242, an action at 244 or entry of an additional user utterance at 246, method 220 preferably proceeds to 248. At 248 method 220 preferably awaits a user response.

In response to detection of a user response at 248, method 220 preferably proceeds to 250. At 250 method 220 preferably provides for receiving a user utterance responsive to the prompting preferably performed at 242, 244 or 246. Similar to the operations preferably performed at 162 of method 150 in FIG. 5, method 220 may record a user response or utterance for evaluation in accordance with the teachings of the present invention. Once a response has been obtained, partially or wholly, method 220 preferably provides for evaluation of the response at 252 before returning to 232 to determine whether the user response contains a usable action-object combination.

In response to a determination at 232 that an action-object combination 238 has been obtained from the forwarded information or from subsequent user prompt responses, method 220 preferably proceeds to 254. At 254, similar to the operations preferably performed at 182 of method 150, method 220 preferably interrogates an action-object matrix associated with the destination service agent to identify processing operations, instructions or other information pertinent to the transaction identified by the action-object combination ascertained from the user utterances.

In response to the identification of processing operations, instructions or other information pertinent to the transaction identified by the action-object combination ascertained from the user utterances at 254, method 220 preferably proceeds to 256 where the identified information may be provided to the caller or user. Following provision of the identified information to the user at 256, method 220 may end at 258. Alternatively, method 220 may provide for routing the caller back to an ACR application that can then inquire of the user or caller as to whether additional transaction processing is desired at 260. In such an embodiment, for example, method 220 may proceed from 260 to 156 of method 150 in FIG. 5. Further, the instant service agent may be arranged to query the user as to their desire for another transaction before returning the user to the ACR application.

Illustrated at 262 in FIG. 8 is one embodiment of a partial action-object matrix that may be implemented in association with a how-to-use service agent. Similar to action-object matrix 200 of FIG. 6 and associated with an automatic call routing application, the intersections of action object-matrix 262 preferably indicate transactions serviceable by the associated application or service agent.

As described above, upon receipt of the caller and the forwarded information, service agent 142 may evaluate or otherwise analyze the forwarded information to ascertain whether there is sufficient information to begin servicing the caller's request, e.g., an action-object combination. Once service agent 142 has identified an action-object combination, CallNotes and setup in one example presented, service agent 142 may consult action-object matrix 262 to determine the processing, instructions or other information associated with the identified action-object combination. In an exemplary embodiment, an intersection of action-object matrix 262, such as intersection 264, may include one or more pointers to a location where the processing, instructions or other information associated with the identified user transaction may be accessed for provision to the caller. In an alternate exemplary embodiment, action-object matrix 262 may be directly associated with a data storage device containing information associated with the action-object combinations available therein.

The approach of the present invention applies to the interaction of any two self-service applications, preferably where one is an ACR application. Further, the approach may be generalized to the situation in which a call is routed from the ACR to a call center agent. In such a case, an action, object, or both, may be passed to an agent, via either a visual or auditory display. In this case, the agent may initiate a dialog appropriate to the given action-object information.

Although the disclosed embodiments have been described in detail, it should be understood that various changes, substitutions and alterations can be made to the embodiments without departing from their spirit and scope. For example, while reference herein is made to a how-to-use service agent, other service agents in communication with an automatic call router may also incorporate teachings of the present invention. Further, reference herein is made to a single referral of a caller in the servicing of a transaction. However, the present invention anticipates the referral of a caller from an automatic call router to a first service agent as well as from the first service agent to one or more further service agents.

What is claimed is:

1. A computer system for call center processing, comprising:
   a processor configured to access memory media,
   wherein the memory media include processor instructions for facilitating user transaction selections in a call center environment employing an automatic call router and one or more transaction service agents, the processor instructions executable to:
   obtain transaction selection information from a user utterance received on a user call;
   identify a service agent destination associated with the transaction selection information and with a service agent operable to assist in performance of the transaction selection;
   identify, for use by the service agent, an action-object combination from the forwarded transaction selection information;
   route the user call, via the automatic call router, to the service agent operable to assist performance of the transaction selection;
   forward at least a portion of the transaction selection information obtained from the user utterance to the service agent;
   initiate performance of the selected transaction at the service agent based on one or more aspects of the forwarded transaction selection information;
   search an action-object matrix associated with the automatic call router for a match with action-object combination identified from the user utterance, the action-object matrix identifying available transactions;
   reference a lookup table associated with the automatic call router action-object matrix, the lookup table including service agent destinations associated with service agents operable to assist performance of the transactions identified in the action-object matrix; and
   prompt the user for additional information in response to a determination of an insufficiency in the forwarded transaction selection information to identify an action-object combination available in the service agent action-object matrix.

2. The computer system of claim 1, wherein the memory media further include processor instructions executable to:
   identify, for use by the automatic call router, an action-object combination from the user utterance transaction selection.

3. The computer system of claim 2, wherein the transaction selection includes at least one of: billing service, repair service, option service, and how-to-use service.

4. The computer system of claim 3, wherein the service agent destinations represent at least one of: automated transaction processing, self-service transaction processing, and human operator transaction processing.

5. The computer system of claim 1, wherein the memory media further include processor instructions executable to:
   search an action-object matrix associated with the service agent for a match with the action-object combination identified from the forwarded transaction selection information, the action-object matrix transaction processing capabilities of the service agent.

6. A method for facilitating transitions between speech-enabled applications using action-object matrices, comprising:
   obtaining transaction selection information from a user utterance received on a user call;

identifying a service agent destination associated with the transaction selection information and with a service agent operable to assist in performance of the transaction selection;

identifying, for use by the service agent, an action-object combination from the forwarded transaction selection information;

routing the user call, via the automatic call router, to the service agent operable to assist performance of the transaction selection;

forwarding at least a portion of the transaction selection information obtained from the user utterance to the service agent;

initiating performance of the selected transaction at the service agent based on one or more aspects of the forwarded transaction selection information;

searching an action-object matrix associated with the automatic call router for a match with the action-object combination identified from the user utterance, the action-object matrix identifying available transactions;

referencing a lookup table associated with the automatic call router action-object matrix, the lookup table including service agent destinations associated with service agents operable to assist performance of the transactions identified in the action-object matrix; and prompting the user for additional information in response to a determination of an insufficiency in the forwarded transaction selection information to identify an action-object combination available in the service agent action-object matrix.

7. A non-transitory computer-readable memory media including instructions for facilitating transitions between speech-enabled applications using action-object matrices, the instructions executable to:

obtain transaction selection information from a user utterance received on a user call;

identify a service agent destination associated with the transaction selection information and with a service agent operable to assist in performance of the transaction selection;

identify, for use by the service agent, an action-object combination from the forwarded transaction selection information; route the user call, via the automatic call router, to the service agent operable to assist performance of the transaction selection;

forward at least a portion of the transaction selection information obtained from the user utterance to the service agent;

initiate performance of the selected transaction at the service agent based on one or more aspects of the forwarded transaction selection information;

search an action-object matrix associated with the automatic call router for a match with the action-object combination identified from the user utterance, the action-object matrix identifying available transactions;

reference a lookup table associated with the automatic call router action-object matrix, the lookup table including service agent destinations associated with service agents operable to assist performance of the transactions identified in the action-object matrix; and prompt the user for additional information in response to a determination of an insufficiency in the forwarded transaction selection information to identify an action-object combination available in the service agent action-object matrix.

8. The memory media of claim 7, wherein the available call center transactions include at least one of: billing transactions, repair transactions, option transactions, and how-to-use transactions.

9. The memory media of claim 7, wherein the service agents represent at least one of: automated agents, self-service agents, and human operators.

* * * * *